UNITED STATES PATENT OFFICE.

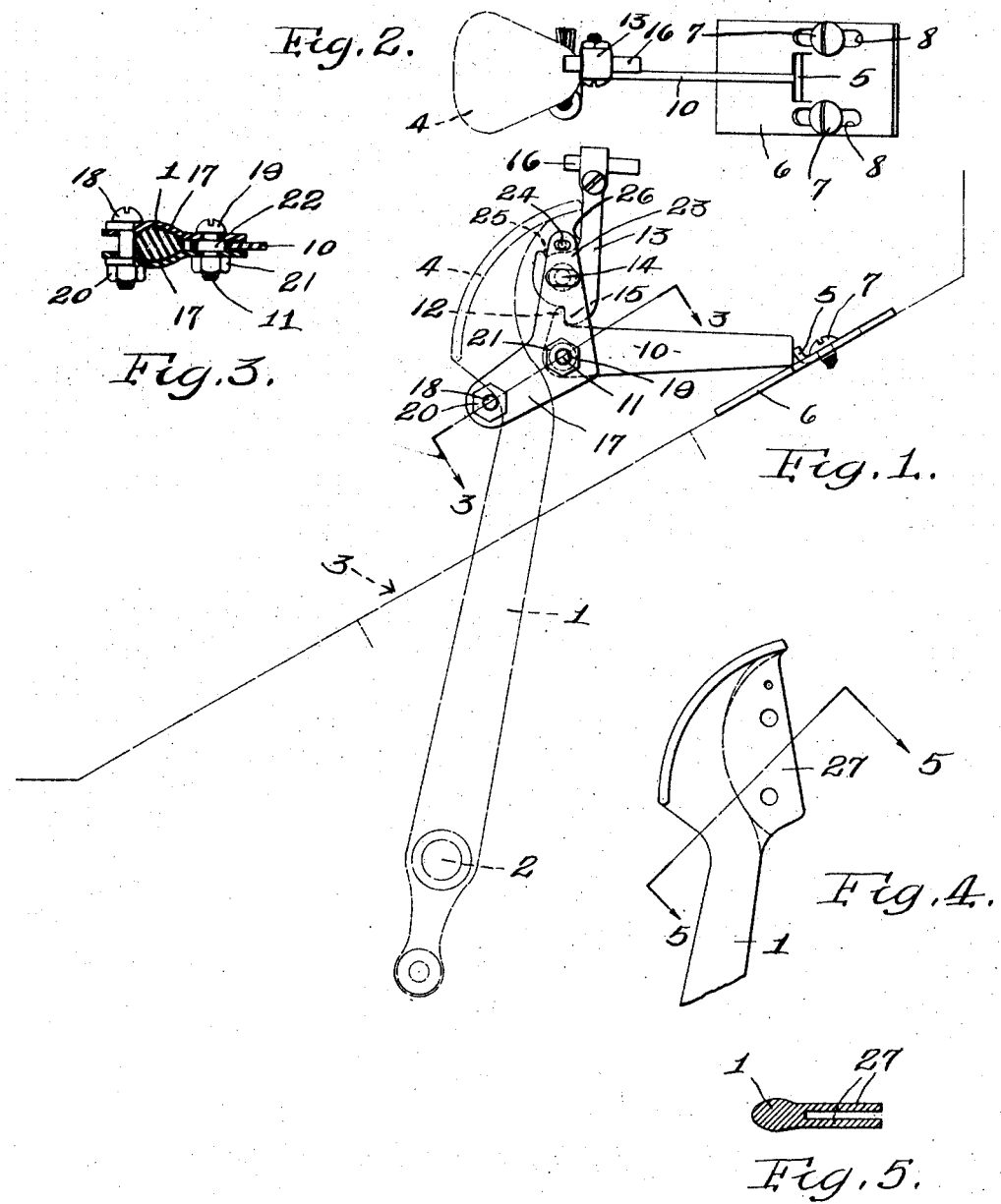

GEORGE G. PORTER, OF SYRACUSE, NEW YORK.

SAFETY NEUTRAL STOP FOR FORD CLUTCH-PEDALS.

1,401,359.  Specification of Letters Patent.  Patented Dec. 27, 1921.

Application filed October 7, 1919. Serial No. 328,984.

*To all whom it may concern:*

Be it known that I, GEORGE G. PORTER, a citizen of the United States, and a resident of Syracuse, in the county of Onondaga and State of New York, have invented a certain new and useful Safety Neutral Stop for Ford Clutch-Pedals, of which the following is a specification.

This invention has for its object a stopping means for the combined clutch and change speed pedals of automobiles as the left pedal of Ford cars, which moves forwardly from neutral position into low speed and is moved rearwardly by its spring into high speed; which means is particularly simple and compact in construction, readily applicable to the cars without any change in the mechanism thereof and highly efficient and durable in use.

The invention consists in the novel features and in the combinations and constructions hereinafter set forth and claimed.

In describing this invention, reference is had to the accompanying drawings in which like characters designate corresponding parts in all the views.

Figure 1 is a side elevation of this stopping means the clutch or left hand pedal of a Ford car and also the floor of the car being also shown in dotted lines.

Fig. 2 is a plan view of parts seen in Fig. 1.

Fig. 3 is a sectional view on line 3—3, Fig. 1.

Fig. 4 is an elevation of a modified form of clutch pedal.

Fig. 5 is a sectional view on line 5—5, Fig. 4.

It is well known that automobiles having a combined clutch and change speed lever such as the left hand pedal of Ford cars are not safe and dependable when a quick stop is imperative for the reason that too much thought and dexterity are required on the part of the driver. Even experienced drivers frequently become confused and do the wrong thing in a situation requiring quick thinking. This is due to the fact that it is unnatural and very difficult to move the left hand or clutch pedal forward out of high gear to its middle or neutral position with one foot, and hold it there without anything to support it, while vigorously applying the brake with the other foot.

The natural tendency especially in an emergency is to bring both feet down together as far as they will go. If this is done the left foot throws the clutch pedal beyond neutral position into its forward position in which the powerful low gear is brought into action while the right foot is applying the brakes.

These two contrary actions result in stalling the engine if the brake is in good working order and is applied with sufficient force, or if the brake is not in good order the car keeps on going. In either event the car is not stopped when it should be. This is often the cause of serious accidents. In fact a great proportion of automobile accidents that happen to persons driving Ford cars is a direct result of moving the clutch pedal forwardly beyond its neutral position and throwing in the powerful low gear when the driver is attempting to stop the car.

This invention comprises means for normally stopping the clutch pedal in neutral position and operable out of its normal position in order to permit the pedal to be moved forwardly beyond neutral position. The illustrated form of my invention comprises a stop member fixed from movement with the pedal, a stop arm carried by the pedal and normally coacting with said stop, and an operating member also carried by the pedal and coacting with the stop arm to move the same out of operative position.

1 designates the clutch pedal such as the left hand pedal of the Ford car, this pedal being pivoted as at 2 below the floor 3 of the car and having a curved foot piece 4 at its upper end.

5 is the fixed stop member which is attachable to the floor 3 of the car in front of the pedal, the stop 5 being here shown as a tongue bent upwardly from the base plate 6 which is attachable to the floor of the car in any suitable manner as by screws 7 extending through slots 8 in the base 6.

10 is the stop arm which extends forwardly from the pedal 1 and normally engages the stop 5, this arm being pivoted at 11 at its rear end and having an upwardly extending tooth 12. 13 is the operating member also carried by the pedal and pivoted at 14 and having a nose 15 at its lower end coacting with the tooth 12 and having an arm extending upwardly across the upper front edge of the foot piece 4 and above the same and having a forward and rearward adjustable foot engaging piece 16 at its upper end.

As shown in Figs. 1 and 3 the stop 10 and trip 13 are pivoted to a support which is attachable to the clutch pedal 1 beneath the foot piece 4, this support consisting of opposing clamping members 17 arranged astride the shank of the clutch pedal 1 and clamped thereon by screw bolts 18, 19 and nuts 20, 21 turning thereon.

The stop arm 10 is mounted on a spacer 22 on the screw 19 between the members 17. The operating or trip lever 13 is mounted on a similar spacer between upward extensions 23 of the members 17. The fore and aft movement of the trip lever 13 is limited by a stop pin 24 extending through the upper ends of the extension 23 between opposing surfaces 25, and 26 at the ends of a recess or slot in the member 13 through which recess the pin 24 extends.

As seen in Figs. 4 and 5 the pedal may be formed with integral spaced apart walls 27 between which the stop lever and trip lever are mountable.

In operation, when stopping a car the right and left foot pedals are both pushed forward as far as they will go, the stop arm 10 engaging the abutment or stop shoulder 5 and preventing the left hand pedal from being pushed forwardly beyond neutral position. When starting, the clutch or left pedal is moved forward until the stop arm 10 engages the lug 5 and is held there while the emergency brake is released. The pedal is then released slightly to release the stop arm 10 from the abutment 5 and the left foot rocked upward and forward on the pedal so that the toe moves the trip lever 13 forwardly and lifts the stop arm 10 free of the abutment or shoulder 5. The clutch pedal is then moved forwardly as far as it will go throwing in the low gear. When reversing the left pedal is held with the stop arm against the stop or abutment 5 while the emergency brake is being released and the reverse pedal operated.

The stop device is particularly advantageous in that it is economical of manufacture, readily applied to the car and further prevents the operation of the car except as intended and hence prevents accidents and inconveniences due to the stalling of the engine, and injury and undue wear to the transmission gearing, brake bands, etc.; and makes the operation of the car easy and safe for inexperienced operators and persons as women with short legs and small feet.

What I claim is:

1. In a motor vehicle, the combination of a clutch and change speed pedal movable upwardly and rearwardly from neutral position into different operative positions, and means for normally locking the pedal from movement forwardly from neutral position comprising a support carried by the pedal, a stop arm pivoted to the support, an upwardly extending lever pivoted to the support and arranged near the foot piece of the pedal and coacting with said arm to trip the same, and a fixed stop normally in the path of the stop arm, the stop arm being movable by the movement of such lever out of the path of the stop, substantially as and for the purpose described.

2. In a motor vehicle, the combination of a clutch and change speed pedal, movable forwardly and rearwardly from neutral position into different operative positions, and means mounted on the pedal for preventing the pedal from movement forwardly from neutral position including a support mounted on a pedal, a stop lever pivoted to the support, and an operating lever carried by the support and coacting with the former lever and having a foot engaging piece extending across one edge of the foot piece for the pedal in position to be engaged by the operator's foot when on the foot piece of the pedal, substantially as and for the purpose specified.

3. In a motor vehicle, the combination of a clutch and change speed pedal movable forwardly and rearwardly from neutral position into different operative positions, and means for normally locking the pedal from movement forwardly from neutral position, said means comprising a support detachably mounted on the pedal, a forwardly extending arm pivoted to the support, an upwardly extending operating lever pivoted to the support and extending above the foot piece of the pedal and coacting with its lower end with said arm to trip the same, and a fixed stop located in front of the pedal and normally in the path of the front end of the stop arm, substantially as and for the purpose set forth.

In testimony whereof, I have hereunto signed my name, at Syracuse, in the county of Onondaga, and State of New York, this 16th day of September, 1919.

GEORGE C. PORTER.